(12) United States Patent
Kariyama et al.

(10) Patent No.: US 9,434,444 B2
(45) Date of Patent: Sep. 6, 2016

(54) BICYCLE HYDRAULIC ACTUATING DEVICE

(71) Applicant: Shimano Inc., Sakai, Osaka (JP)

(72) Inventors: Osamu Kariyama, Osaka (JP); Daisuke Nago, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 393 days.

(21) Appl. No.: 14/075,333

(22) Filed: Nov. 8, 2013

(65) Prior Publication Data

US 2015/0128798 A1    May 14, 2015

(51) Int. Cl.
| B60T 7/02 | (2006.01) |
| B62L 3/02 | (2006.01) |
| B60T 7/10 | (2006.01) |

(52) U.S. Cl.
CPC ............... *B62L 3/023* (2013.01); *B60T 7/102* (2013.01)

(58) Field of Classification Search
CPC .................................. B60T 7/102; B62L 3/023
USPC .......................................................... 60/594
See application file for complete search history.

(56) References Cited

U.S. PATENT DOCUMENTS

| 3,554,096 | A | * | 1/1971 | DeJager ............. F15B 15/12 92/125 |
| 5,044,257 | A | * | 9/1991 | Scobie ................ B29C 43/18 264/269 |
| 6,370,877 | B1 | | 4/2002 | Lin et al. |
| 6,511,040 | B2 | * | 1/2003 | Gardner ............ F15B 15/1476 251/59 |
| 7,204,350 | B2 | | 4/2007 | Lumpkin |
| 8,201,670 | B2 | | 6/2012 | Tetsuka et al. |
| 8,448,762 | B2 | | 5/2013 | Hirose et al. |
| 8,464,844 | B2 | | 6/2013 | Jordan |
| 2007/0215416 | A1 | | 9/2007 | Chen |
| 2010/0186538 | A1 | * | 7/2010 | Tetsuka ............. B60T 7/102 74/501.6 |
| 2012/0042775 | A1 | * | 2/2012 | Lind ................. B60T 7/102 92/163 |
| 2012/0240715 | A1 | | 9/2012 | Tsai |
| 2012/0241261 | A1 | | 9/2012 | Tsai |
| 2013/0255239 | A1 | | 10/2013 | Miki |

FOREIGN PATENT DOCUMENTS

| DE | 2 151 084 B1 | 1/1973 |
| DE | 10 2010 037 101 A1 | 2/2012 |
| EP | 1 992 557 A2 | 11/2008 |

* cited by examiner

*Primary Examiner* — Thomas E Lazo
*Assistant Examiner* — Daniel Collins
(74) *Attorney, Agent, or Firm* — Global IP Counselors

(57) ABSTRACT

A bicycle hydraulic actuating device is provided with a housing, a non-linear piston and an operating member. The housing defines a chamber and has a fluid outlet. The non-linear piston is movably disposed in the chamber along a non-linear movement path between a first position and a second position. The operating member is operatively coupled to the non-linear piston so as to move the non-linear piston within the chamber between the first position and the second position in response to movement of the operating member.

23 Claims, 16 Drawing Sheets

BICYCLE HYDRAULIC ACTUATING DEVICE

BACKGROUND

1. Field of the Invention

This invention generally relates to a bicycle hydraulic actuating device. More specifically, the present invention relates to a bicycle hydraulic actuating device for operating a braking device.

2. Background Information

Generally, bicycles are typically provided with one or more bicycle control devices that include a user operating member that is manually operated to actuate one or more bicycle components. In the past, cables were used to actuate the bicycle component in response to manual operation of the user operating member. More recently, some bicycles have been equipped with hydraulically actuated bicycle components that are actuated using a bicycle hydraulic actuating device. For example, some bicycles have been equipped with a hydraulic brake system. The hydraulic brake system for a bicycle typically has a bicycle hydraulic actuating device that is fluidly coupled to a brake caliper by a hydraulic brake hose. The brake caliper is hydraulically controlled by hydraulic fluid flowing through the hydraulic brake hose in response to operation of a brake lever of the bicycle hydraulic actuating device. In particular, operation of the brake lever forces hydraulic fluid through the hydraulic brake hose to the brake caliper. The hydraulic fluid then moves one of more pistons to cause the brake pads to squeeze a rotor that is attached to a hub of a bicycle wheel.

SUMMARY

Generally, the present disclosure is directed to various features of a bicycle hydraulic actuating device for actuating a bicycle component. One aspect is to provide a bicycle hydraulic actuating device having a non-linear piston that moves along a non-linear movement path. With this arrangement, a relatively compact hydraulic actuating device can be provided.

In view of the state of the known technology and in accordance with a first aspect of the present disclosure, a bicycle hydraulic actuating device is provided that basically comprises a housing, a non-linear piston and an operating member. The housing defines a chamber and has a fluid outlet. The non-linear piston is movably disposed in the chamber along a non-linear movement path between a first position and a second position. The operating member is operatively coupled to the non-linear piston so as to move the non-linear piston within the chamber between the first position and the second position in response to movement of the operating member.

In accordance with a second aspect of the present invention, the bicycle hydraulic actuating device according to the first aspect further comprises a base member that is adapted to fixed to a bicycle part and operatively coupled to the housing.

In accordance with a third aspect of the present invention, the bicycle hydraulic actuating device according to the first aspect is configured so that the non-linear piston is pivotally mounted within the chamber.

In accordance with a fourth aspect of the present invention, the bicycle hydraulic actuating device according to the third aspect is configured so that the non-linear piston includes a hub portion defining a pivot axis of the non-linear piston.

In accordance with a fifth aspect of the present invention, the bicycle hydraulic actuating device according to the fourth aspect is configured so that the operating member is configured to pivot around the pivot axis of non-linear piston.

In accordance with a sixth aspect of the present invention, the bicycle hydraulic actuating device according to the fifth aspect is configured so that the operating member is configured to be a lever member having a first end connected to the hub portion and a second end that extends outwardly from the hub portion of the non-linear piston.

In accordance with a seventh aspect of the present invention, the bicycle hydraulic actuating device according to the first aspect further comprises a biasing element biasing the non-linear piston to the first position.

In accordance with an eighth aspect of the present invention, the bicycle hydraulic actuating device according to the fourth aspect is configured so that the non-linear piston includes a sealing member that is in sealing contact with the housing.

In accordance with a ninth aspect of the present invention, the bicycle hydraulic actuating device according to the eighth aspect is configured so that the chamber is at least partially defined by a first side surface, a second side surface and a transverse surface. The transverse surface extends between the first and second side surfaces of the housing. The sealing member contacts the transverse surface at two angularly offset points with respect to the pivot axis.

In accordance with a tenth aspect of the present invention, the bicycle hydraulic actuating device according to the ninth aspect is configured so that the transverse surface includes a first curved portion contacting a first contact portion of the sealing member and a second curved portion contacting a second contact portion of the sealing member. The first and second curved portions are non-continuous arcs.

In accordance with an eleventh aspect of the present invention, the bicycle hydraulic actuating device according to the tenth aspect is configured so that the first curved portion has a larger radius of curvature than the second curved portion.

In accordance with a twelfth aspect of the present invention, the bicycle hydraulic actuating device according to the tenth aspect is configured so that the second curved portion is located closer to the pivot axis than the first curved portion.

In accordance with a thirteenth aspect of the present invention, the bicycle hydraulic actuating device according to the tenth aspect is configured so that the transverse surface further includes a non-seal contact portion that is disposed between the first and second curved portions. The first and second contact portions of the sealing member are configured without contacting the first and second contact portions of the sealing member as the non-linear piston moves between the first position and the second position.

In accordance with a fourteenth aspect of the present invention, the bicycle hydraulic actuating device according to the eighth aspect is configured so that the non-linear piston includes a first vane extending outwardly from the hub portion in a radial direction with respect to the pivot axis and a second vane extending outwardly from the hub portion in a radial direction with respect to the pivot axis. The first vane has a free end with the first contact portion of the sealing member disposed thereon. The second vane has a free end with the second contact portion of the sealing member disposed thereon.

In accordance with a fifteenth aspect of the present invention, the bicycle hydraulic actuating device according to the fourteenth aspect is configured so that the first vane has a first length as measured from the pivot axis to a radially outermost point of the first vane with respect to the pivot axis. The second vane has a second length as measured from the pivot axis to a radially outermost point of the second vane with respect to the pivot axis. The second length of the first second is smaller than the first length of the first vane.

In accordance with a sixteenth aspect of the present invention, the bicycle hydraulic actuating device according to the second aspect further comprises a mechanical shifting unit that is operatively mounted on the base member and configured to operate a bicycle gear shifting component.

In accordance with a seventeenth aspect of the present invention, the bicycle hydraulic actuating device according to the sixteenth aspect is configured so that the mechanical shifting unit has a shift lever protruding out of the base member.

In accordance an eighteenth aspect of the present invention, the bicycle hydraulic actuating device according to the second aspect further comprises an electric control unit that is operatively mounted on the base member and configured to operate an electrical bicycle component.

In accordance with a nineteenth aspect of the present invention, the bicycle hydraulic actuating device according to the eighteenth aspect is configured so that the electric control unit includes a switch unit.

In accordance with a nineteenth aspect of the present invention, the bicycle hydraulic actuating device according to the eighteenth aspect is configured so that the switch unit is mounted on the operating member.

In accordance with a twentieth aspect of the present invention, the bicycle hydraulic actuating device according to the nineteenth aspect is configured so that the switch unit is mounted on the operating member.

In accordance with a twenty-first aspect of the present invention, the bicycle hydraulic actuating device according to the second aspect is configured so that the base member includes a gripping portion that is configured to be gripped by a bicycle rider.

In accordance with a twenty-second aspect of the present invention, the bicycle hydraulic actuating device according to the first aspect is configured so that the operating member is configured to be a lever member that moves between a rest position and an operated position.

In accordance with a twenty-third aspect of the present invention, the bicycle hydraulic actuating device according to the twenty-second aspect further comprises a lever reach adjustment mechanism that is configured to adjust the rest position of the lever member.

In accordance with a twenty-fourth aspect of the present invention, the bicycle hydraulic actuating device according to the first aspect further comprises a piston position adjustment mechanism that is configured to adjust the first position of the non-linear piston along a non-linear movement path.

Also other objects, features, aspects and advantages of the disclosed hydraulic actuating device will become apparent to those skilled in the art from the following detailed description, which, taken in conjunction with the annexed drawings, discloses one embodiment of the bicycle hydraulic actuating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
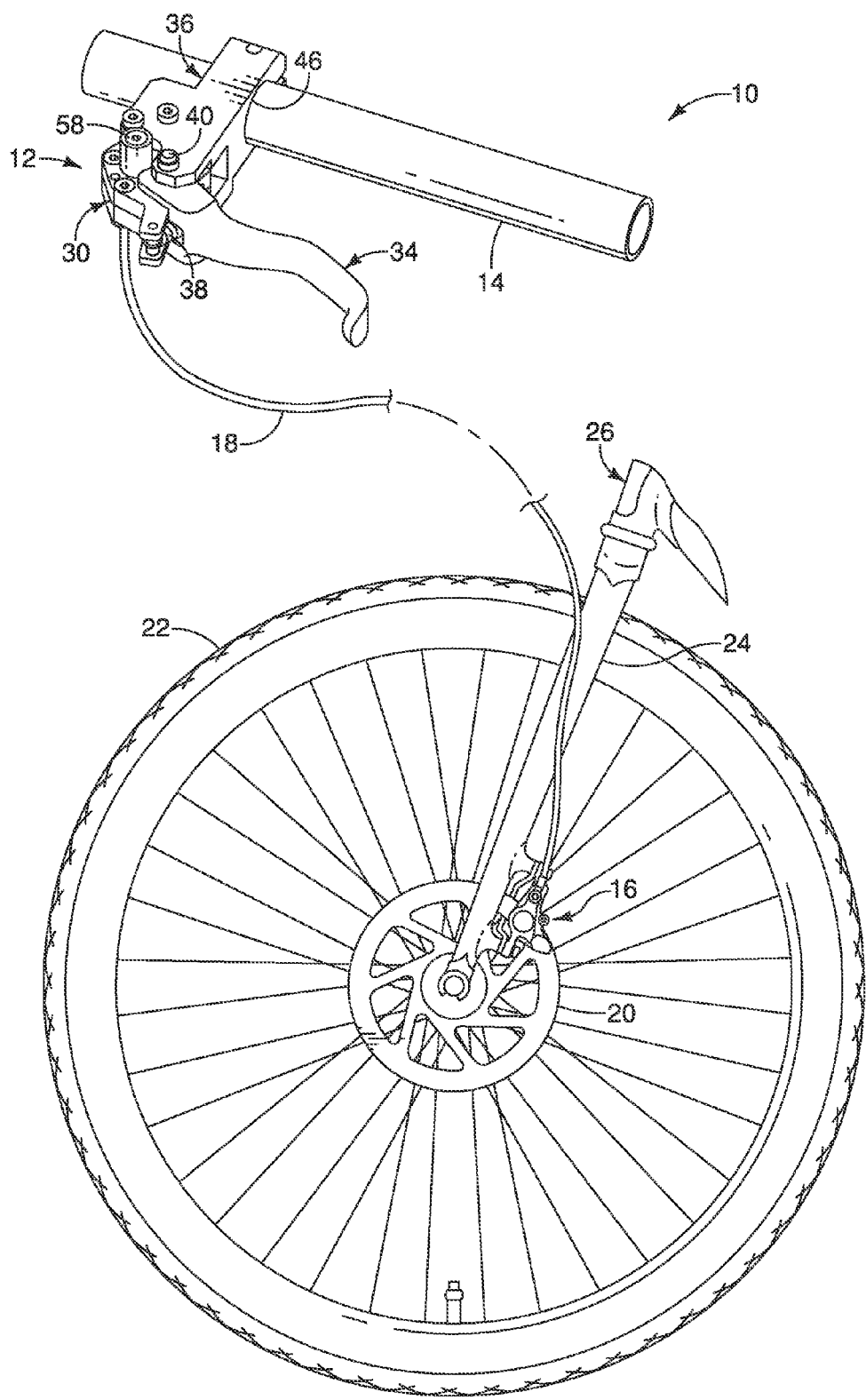
FIG. 1 is a diagrammatic perspective-elevational view of a bicycle braking system that is equipped with a bicycle hydraulic actuating device in accordance with one illustrated embodiment in which the bicycle hydraulic actuating device is mounted to a portion of a flat handlebar for controlling a front bicycle braking device.
Figure 2:
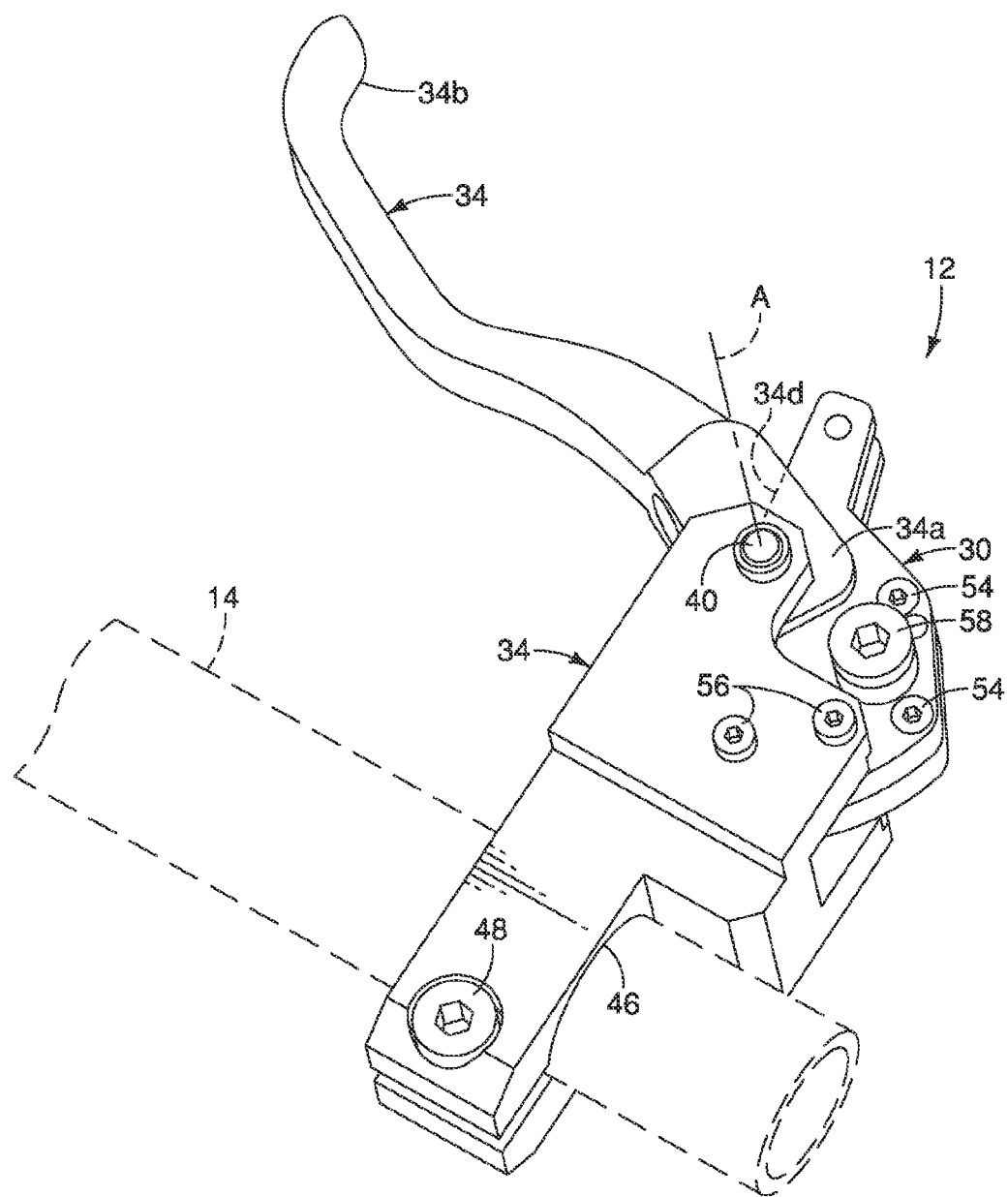
FIG. 2 is a top perspective view of the bicycle hydraulic actuating device illustrated FIG. 1.

Referring initially to FIGS. 1 and 2, a bicycle hydraulic braking system 10 is illustrated that includes a bicycle hydraulic actuating device 12 in accordance with a first embodiment. The bicycle hydraulic actuating device 12 is mounted on a flat handlebar 14 that is typically used with off road bicycles and comfort bicycles. Thus, in the illustrated embodiment, the bicycle hydraulic actuating device 12 is a bicycle flat handlebar brake actuating device. The bicycle hydraulic braking system 10 further includes a hydraulically operated brake device 16 (e.g. a brake caliper) that is fluidly connected to the bicycle hydraulic actuating device 12 by a hydraulic hose 18. Basically, operation of the bicycle hydraulic actuating device 12 forces hydraulic fluid (e.g. mineral oil) from the bicycle hydraulic actuating device 12 into the brake device 16 such that the brake device 16 is actuated for squeezing a brake rotor 20 that is attached to a bicycle wheel 22.

The bicycle hydraulic actuating device 12 is a left hand side control device that operated by the rider's left hand to operate the brake device 16, which is mounted to a front fork 24 of a bicycle 26. It will be apparent to those skilled in the art that the configuration of the bicycle hydraulic actuating device 12 can be adapted to be mounted on a right hand side of the flat handlebar 14 for operation by the rider's right hand. The hydraulically operated brake device 16 is a conventional bicycle component that is hydraulically operated in a conventional manner. Since the hydraulically operated brake device 16 is conventional, it will not be discussed and/or illustrated in detail herein.

Because the components of the bicycle 26, except for the bicycle hydraulic actuating device 12, are conventionally known in the relevant art, details relating to the components of the bicycle 26 are not described or illustrated herein, except for components pertinent to the control device 12 of the present invention. Furthermore, various components of a conventional bicycle not illustrated or described herein, including other braking devices, shifting devices, sprockets, and the like, can also be used together with the bicycle hydraulic actuating device 12.

Figure 3:
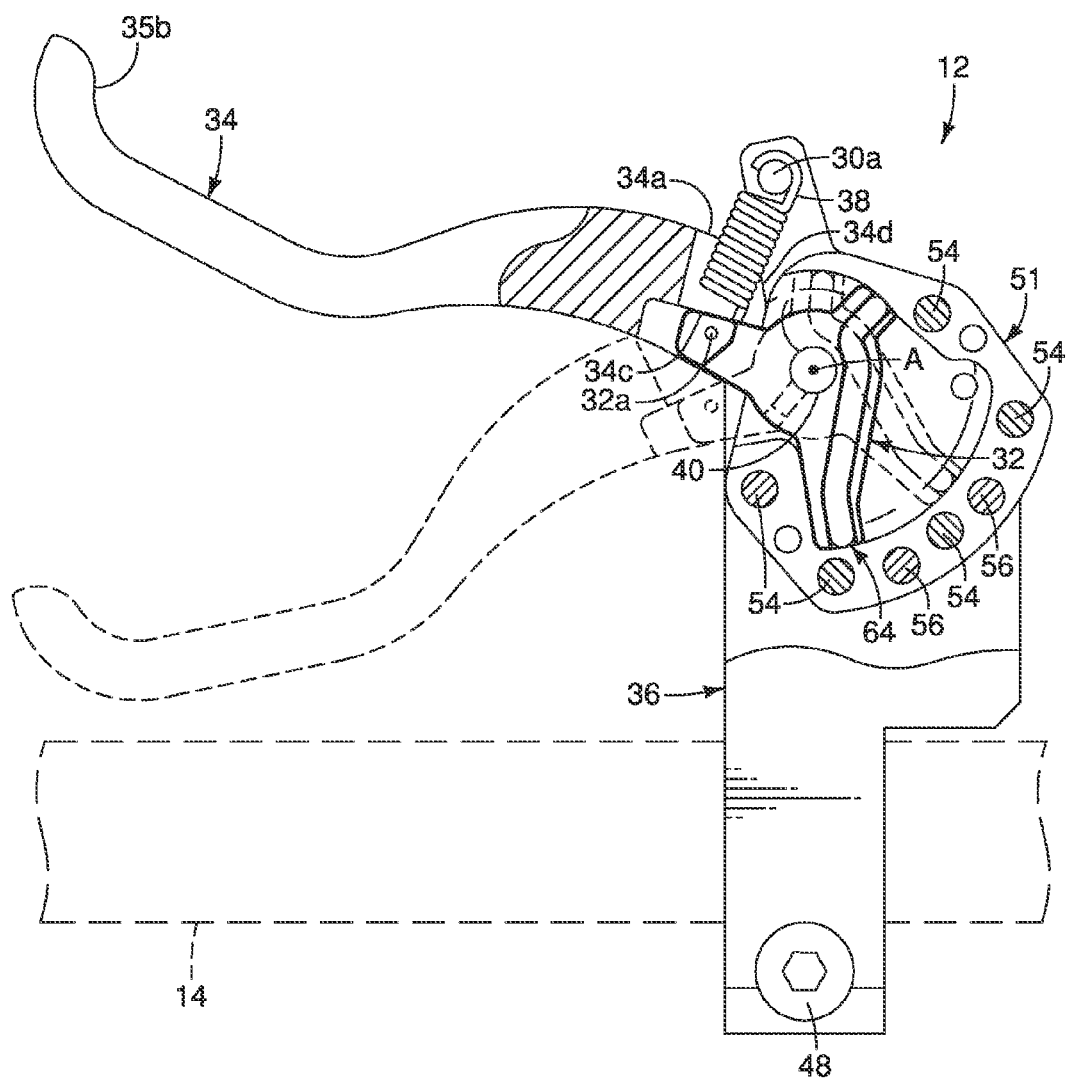
FIG. 3 is a top plan view of the bicycle hydraulic actuating device illustrated FIGS. 1 and 2, with the operating member shown in a rest position in full lines and the operating member shown in an actuated position in broken lines.

As seen in FIGS. 2 and 3, the bicycle hydraulic actuating device 12 basically comprises a housing 30, a non-linear piston 32 and an operating member 34. As seen in FIG. 3, the non-liner piston 32 is movably disposed in the housing 30 along a non-liner movement path between a first position (shown in solid lines in FIG. 3) and a second position (shown in broken lines in FIG. 3). The bicycle hydraulic actuating device 12 further comprises a base member 36 that is adapted to be fixed to a bicycle part and operatively coupled to the housing 30. The bicycle hydraulic actuating device 12 further comprises a biasing element 38 biasing the non-linear piston 32 to the first position (FIG. 3). Here, in the first illustrated embodiment, the first position of the non-linear piston 32 corresponds to a rest position (i.e., a non-actuated position) and the second position of the non-linear piston 32 corresponds to an actuated (operated) position.

Figure 4:
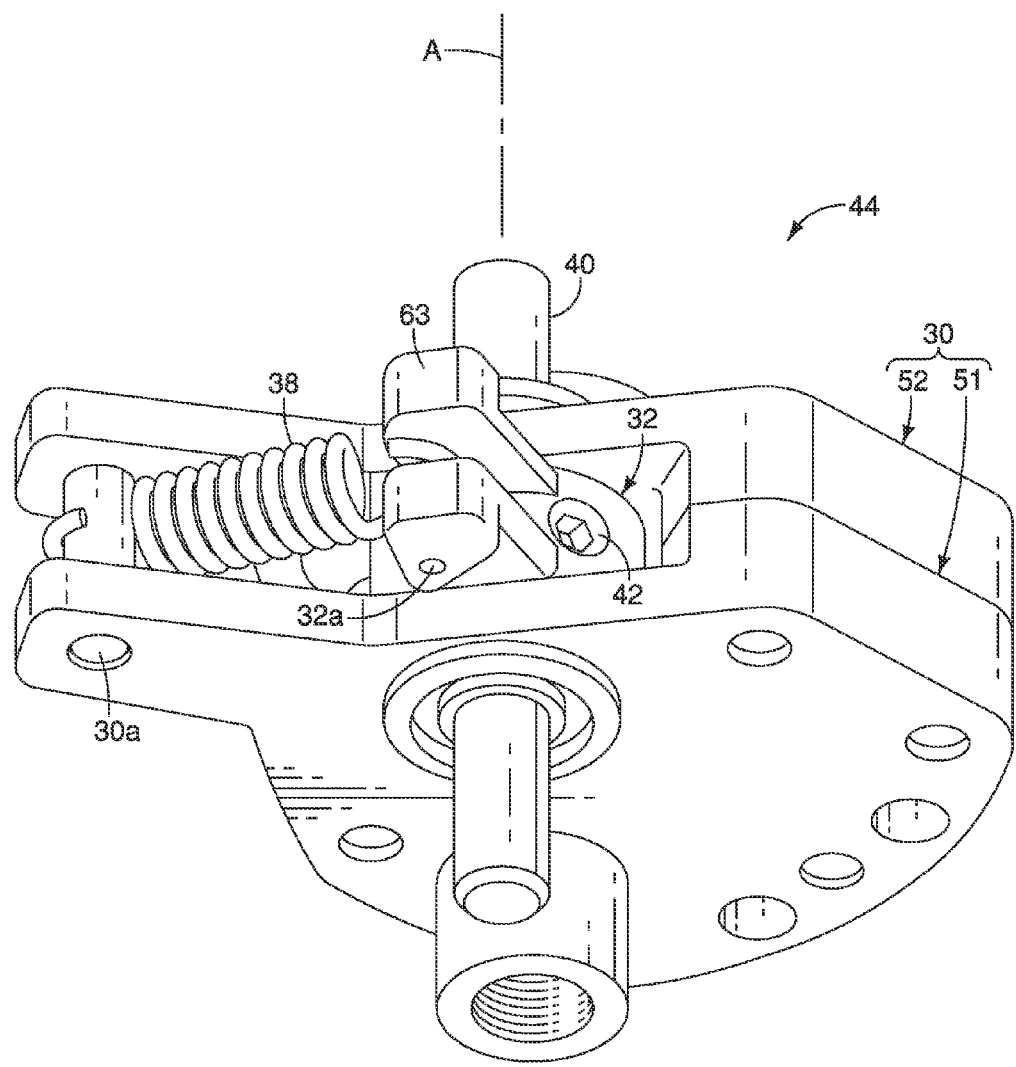
FIG. 4 is a bottom side perspective view of the actuator member of the bicycle hydraulic actuating device illustrated FIGS. 1 to 3, with the operating member removed.

As seen in FIG. 4, the bicycle hydraulic actuating device 12 further comprises an operating shaft 40. The operating shaft 40 defines a pivot axis A of the non-linear piston 32. The operating shaft 40 is fixed to the non-linear piston 32 by a set screw 42. Basically, as seen in FIG. 4, the housing 30, the non-linear piston 32, the biasing element 38 and the operating shaft 40 constitute a hydraulic actuator member 44.

As seen in FIG. 3, as the operating member 34 is operated by the rider, the non-linear piston 32 is pivoted about a pivot axis A such that the hydraulic fluid within the housing 30 will be forced into the hydraulic hose 18 to actuate the brake device 16. The operating member 34 is configured to pivot around the pivot axis A of non-linear piston 32. The operating member 34 is configured to be a lever member moving between a rest position and an operated position. The operating member 34 is configured to be a lever member. Specifically, the operating member 34 is a manually operated lever member that is operated by a rider manually moving the operating member 34. Here, the operating member 34 is preferably a pivoting lever member. The operating member 34 has a first end 34a that is connected to the non-linear piston 32 and a second end 34b that extends outwardly from the non-linear piston 32.

Figure 5:
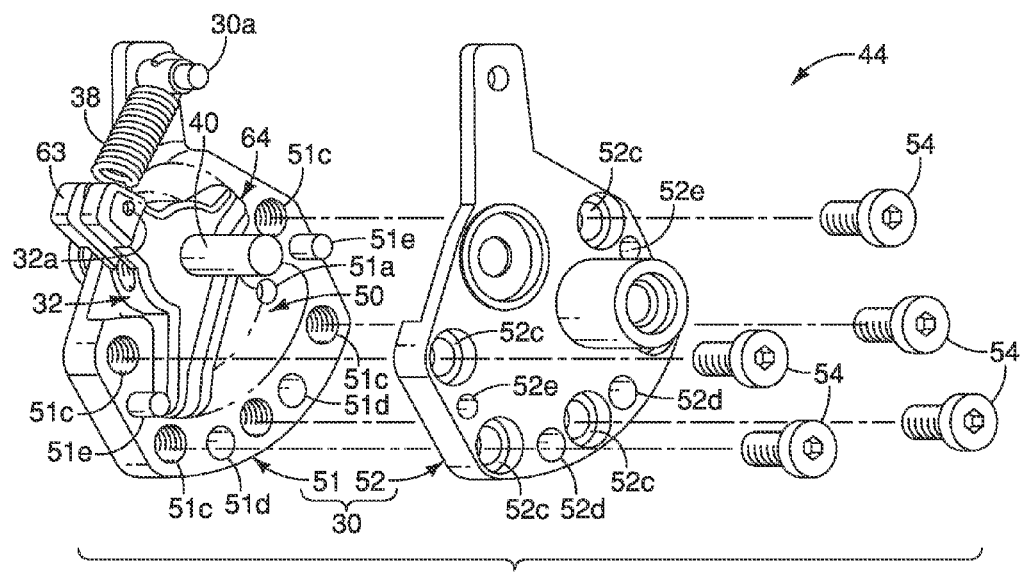
FIG. 5 is an exploded side perspective view of the actuator member of the bicycle hydraulic actuating device illustrated FIGS. 1 to 3, with the operating member removed.

As seen in FIGS. 4 and 5, the biasing element 38 is a coiled tension spring having a first connecting end connected to the housing 30 by an attachment pin 30a and a second connecting end connected to the non-linear piston 32 by an attachment pin 32a. Thus, the biasing element 38 biasing the non-linear piston 32 to the first position (i.e., the rest position or non-actuated position).

Referring back to FIG. 3, the biasing element 38 functions as return spring for operating member 34. Specifically, the non-linear piston 32 is held against an abutment 34c of the operating member 34 and the operating member 34 contacts the housing 30 with an abutment 34d (shown in broken line in FIG. 2) by the biasing element 38 such that the operating member 34 is sandwiched between the housing 30 and the non-linear piston 32. Thus, the operating member 34 is prevented from moving while the operating member 34 is in the rest position as seen in FIG. 3. When a rider operates the operating member 34 to the operated position (shown in broken lines in FIG. 3), the non-linear piston 32 and the operating member 34 rotate together about the pivot axis A against the biasing force of the biasing element 38. Once the rider releases the operating member 34, the non-linear piston 32 and the operating member 34 return to the rest position under the biasing force of the biasing element 38.

Still referring to FIG. 3, the operating shaft 40 also supports the operating member 34 on the housing 30 and the base member 36. The operating member 34 is not fixed to the operating shaft 40. Rather, the operating member 34 is mounted on the operating shaft 40 such that the operating member 34 can freely pivot on the operating shaft 40. However, as mentioned above, the non-linear piston 32 and the biasing element 38 are arranged to restrict the movement of the operating member 34 on the operating shaft 40. Specifically, as seen in FIG. 3, the biasing element 38 biases the non-linear piston 32 against the abutment 34c of the operating member 34 such that the operating member 34 is biased by the biasing element 38 against the housing 30. Thus, the biasing element 38 biases the operating member 34 to the rest position as shown in solid lines in FIG. 3. When the operating member 34 is operated by the rider, the operating member 34 pivots about the pivot axis A and rotates the non-linear piston 32 against the biasing force of the biasing element 38 to the actuated position as shown in broken lines in FIG. 3.

Typically, as shown in FIGS. 1 to 3, the base member 36 is mounted on the handlebar 14 such that a rider can operate the operating member 34. In the illustrated embodiment, the base member 36 constitutes a bicycle mounting member for mounting the bicycle hydraulic actuating device 12 on the flat handlebar 14. While the base member 36 is illustrated as a separate member from the housing 30, it will be apparent to those skilled in the bicycle field from this disclosure that the base member 36 and the housing 30 can be integrated together. Here, the base member 36 includes a split tube clamp (non-hinged tube clamp) defining a handlebar opening 46. The bicycle mounting member 36 has a clamp bolt 48 for reducing an inside diameter of the handlebar opening 46 in a conventional manner. Of course, alternatively, a hinged tube clamp can be used instead of the split tube clamp as needed and/or desired. Since hinged tube clamp are well known in the bicycle field, an example of a hinged tube clamp will not be illustrated herein.

Figure 10:
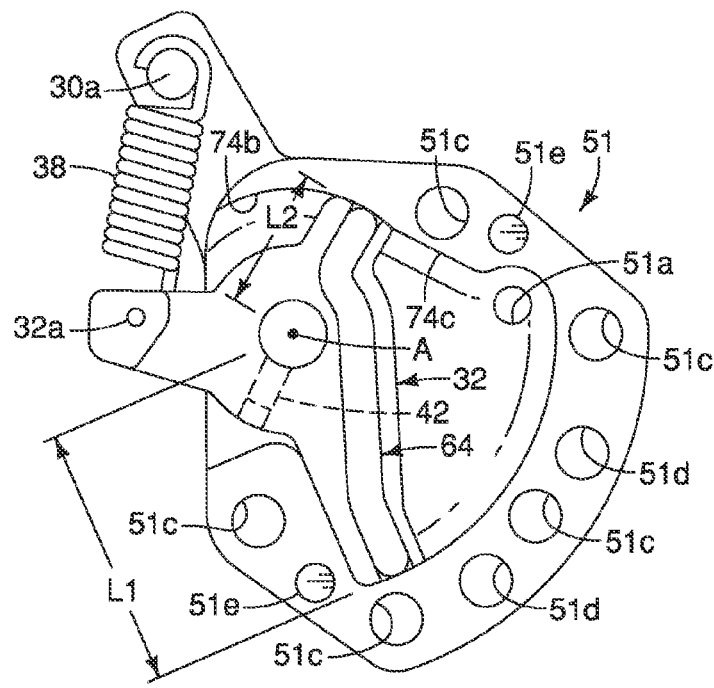
FIG. 10 is an interior view of the actuator member of the bicycle hydraulic actuating device illustrated FIGS. 1 to 3, with the non-linear piston shown in the rest position.
Figure 11:
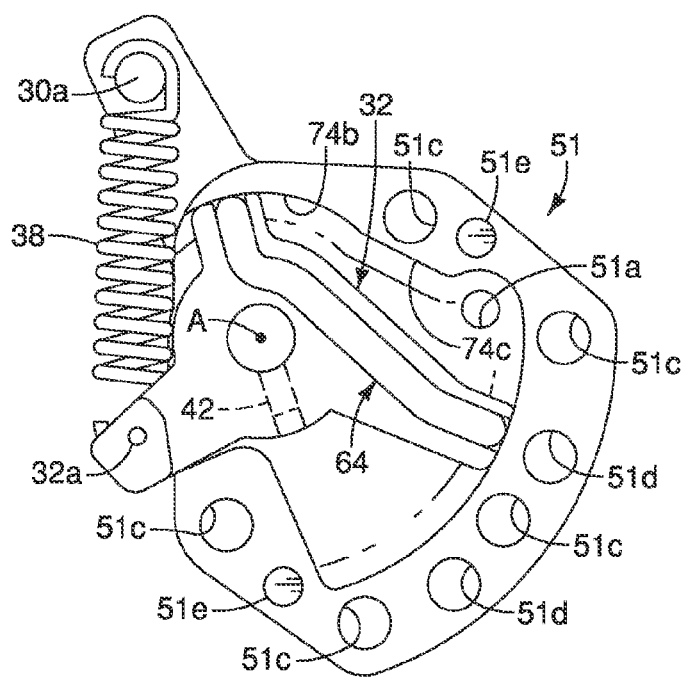
FIG. 11 is an interior view, similar to FIG. 10, of the actuator member of the bicycle hydraulic actuating device illustrated FIGS. 1 to 3, with the non-linear piston shown in the actuated position.
Figure 12:
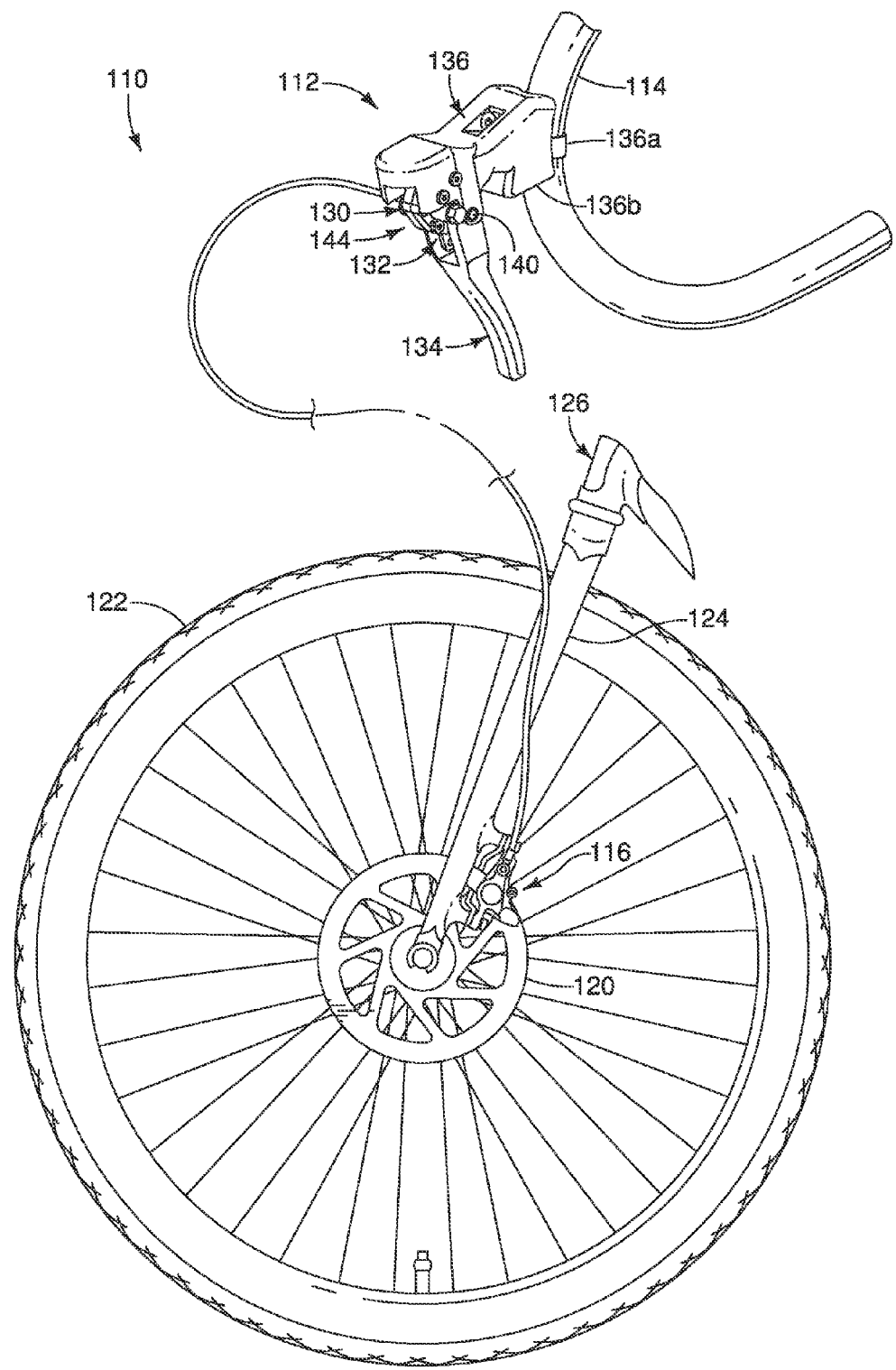
FIG. 12 is a diagrammatic perspective-elevational view of a bicycle braking system that is equipped with a bicycle hydraulic actuating device in accordance with a second illustrated embodiment in which the bicycle hydraulic actuating device is mounted to a portion of a drop handlebar for controlling a front bicycle braking device.
Figure 13:
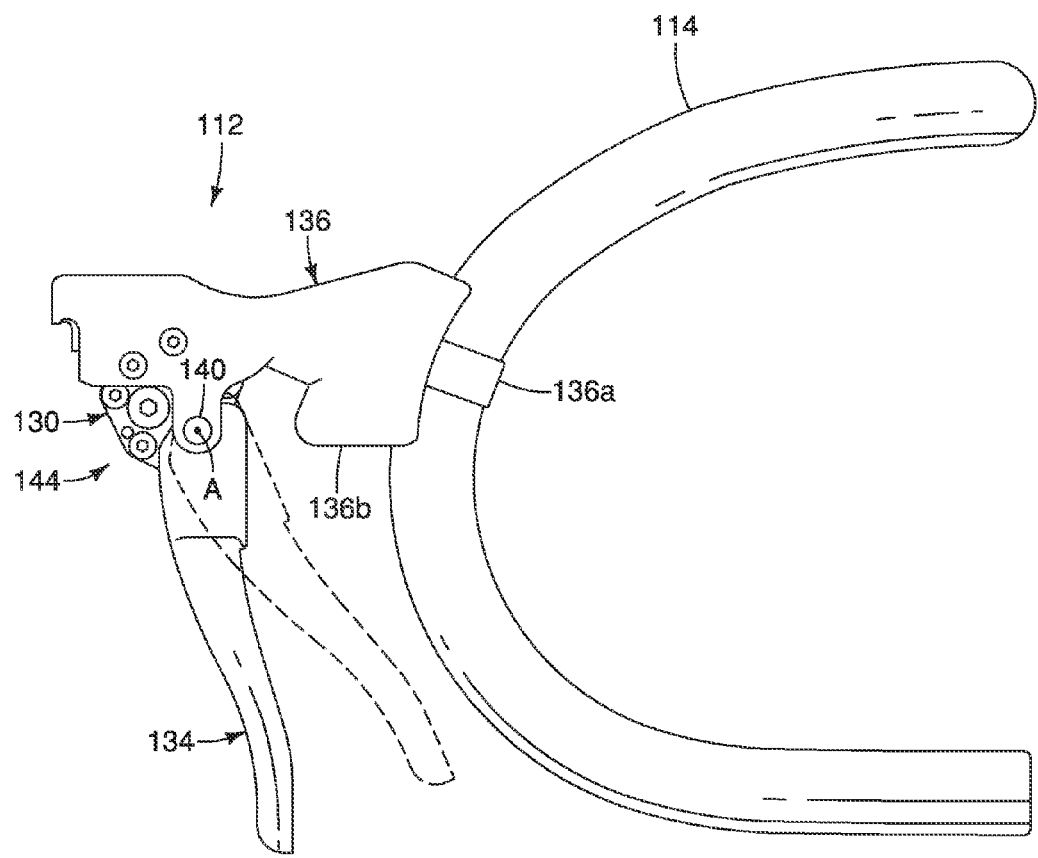
FIG. 13 is a side elevational view of the bicycle hydraulic actuating device illustrated FIG. 12, with the operating member shown in a rest position in full lines and the operating member shown in an actuated position in broken lines.

As seen in FIG. 5, the housing 30 defines a chamber 50. The non-linear piston 32 is movably disposed in the chamber 50 along a non-linear movement path between the first position (FIG. 10) and the second position (FIG. 11). In particularly, the non-linear piston 32 is pivotally mounted to housing 30 for pivoting within the chamber 50. The operating member 34 is operatively coupled to the non-linear piston 32 so as to move the non-linear piston 32 within the chamber 50 between the first position (FIG. 10) and the second position (FIG. 1) in response to movement of the operating member 34.

In the illustrated embodiment, as best seen in FIG. 5, the housing 30 basically includes a first housing part 51 and a second housing part 52. The first and second housing parts 51 and 52 are fixedly coupled together by a plurality of bolts 54. Alternatively, instead of having the first and second housing parts 51 and 52 bolted together, the housing 30 can be formed as a one-piece member as needed and/or desired. The housing 30 is fixedly coupled to the base member 36 by a pair of bolts 56 (FIGS. 2 and 3). The first housing part 51 of the housing 30 has a fluid outlet 51a that is connected to the hydraulic hose 18. Thus, operation of the operating member 34 moves the non-linear piston 32, which forces the hydraulic fluid from the chamber 50 into the brake device 16 such that the brake device 16 is actuated for squeezing the brake rotor 20. Preferably, the second housing part 52 has a filler port 52a (FIG. 7) that is closed off by a plug 58 (FIG. 2).

Figure 6:
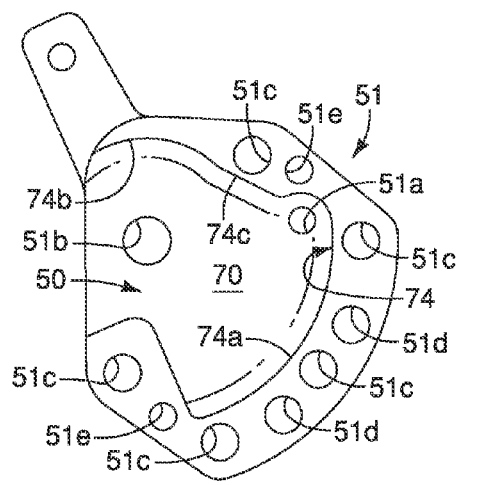
FIG. 6 is an interior side plan view of a first housing part of the actuator member of the bicycle hydraulic actuating device illustrated FIGS. 1 to 3.

In the illustrated embodiment, as best seen in FIG. 6, the first housing part 51 includes an opening 51b that receives the operating shaft 40 therethrough. The first housing part 51 also includes a plurality of threaded holes 51c for threadedly receiving the bolts 54. The first housing part 51 also includes a pair of holes 51d for receiving the bolts 56 therethrough. The first housing part 51 also includes a pair of locating pins 51e for engaging the second housing part 52 in order to aiding in the assembly of the first and second housing parts 51 and 52 together.

Figure 7:
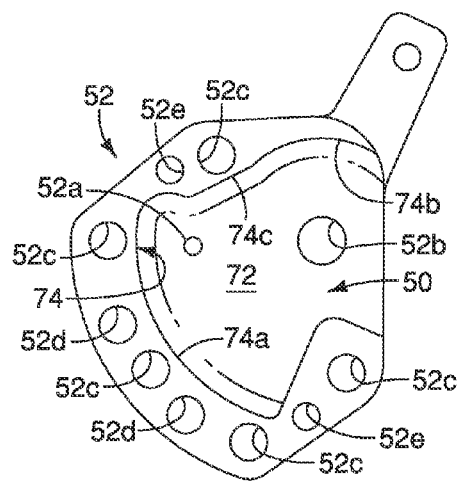
FIG. 7 is an interior side plan view of a second housing part of the actuator member of the bicycle hydraulic actuating device illustrated FIGS. 1 to 3.

In the illustrated embodiment, as best seen in FIG. 7, the second housing part 52 includes an opening 52b that receives the operating shaft 40 therethrough. The second housing part 52 also includes a plurality of threaded holes 52c for receiving the bolts 54 therethrough. The second housing part 52 also includes a pair of holes 52d for receiving the bolts 56 therethrough. The second housing part 52 also includes a pair of locating holes 52e for receiving the locating pins 51e in order to aiding in the assembly of the first and second housing parts 51 and 52 together.

As seen in FIGS. 8 to 11, the non-linear piston 32 includes a hub portion 60 defining the pivot axis A of the non-linear piston 32. The non-linear piston 32 includes a first vane 61 extending outwardly from the hub portion 60 in a radial direction with respect to the pivot axis A and a second vane 62 extending outwardly from the hub portion 60 in a radial direction with respect to the pivot axis A. The non-linear piston 32 further includes an operated portion 63 that projects outwardly from the hub portion 60. The operated portion 63 also projects out of the chamber 50 of the housing 30. The hub portion 60, the first vane 61, the second vane 62 and the operated portion 63 constitute a main body 32b of the non-linear piston 60. The biasing element 38 is attached to the operated portion 63 of the non-linear piston 32 by the attachment pin 32a.

Figure 8:
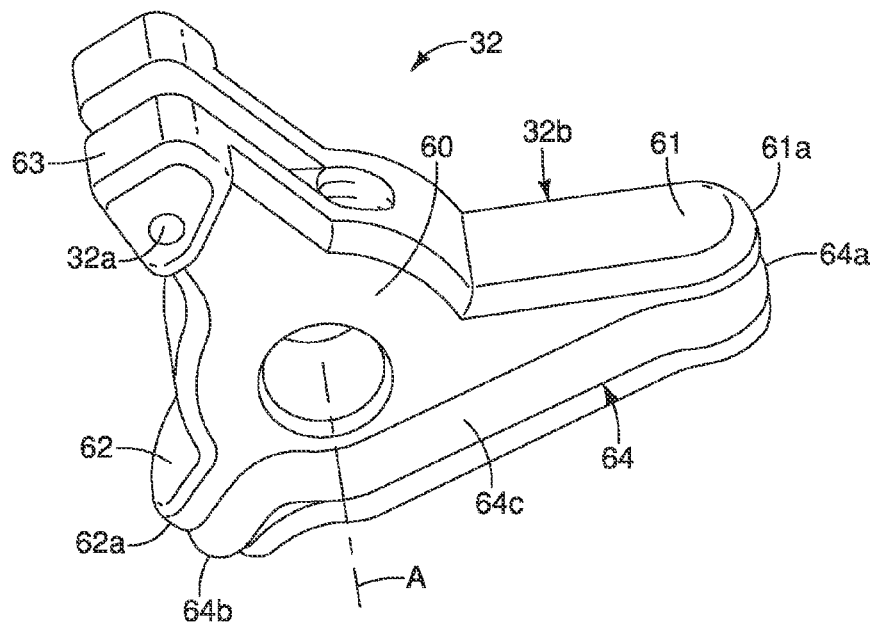
FIG. 8 is a perspective view of a non-linear piston of the actuator member of the bicycle hydraulic actuating device illustrated FIGS. 1 to 3.
Figure 9:
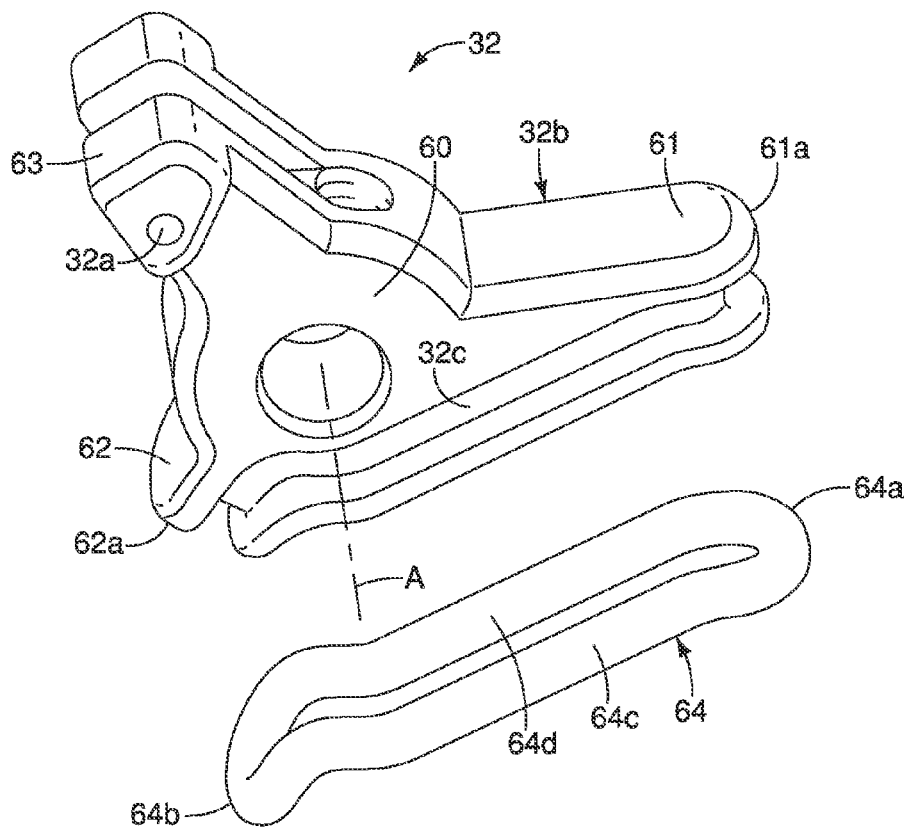
FIG. 9 is an exploded perspective view of the non-linear piston illustrated FIG. 8.

As seen in FIGS. 8 and 9, the non-linear piston 32 includes a sealing member 64 that is in sealing contact with the housing 30. The sealing member 64 is an elastomeric ring that is disposed on the main body 32b. In particular, the non-linear piston 32 has a recess or groove 32b that receives the sealing member 64. The sealing member 64 includes a first contact portion 64a, second contact portion 64b, a third contact portion 64c and a fourth contact portion 64d. The first and second contact portions 64a and 64b interconnect the third and fourth contact portions 64c and 64d. The third contact portion 64c is in sealing contact with the first housing part 51, while the fourth contact portion 64d is in sealing contact with the second housing part 52. The first and second contact portions 64a and 64b is in sealing contact with both the first and second housing parts 51 and 52.

As seen in FIGS. 8 and 9, the first vane 61 has a free end 61a with the first contact portion 64a of the sealing member 64 disposed thereon. The second vane 62 has a free end 62a with the second contact portion 64b of the sealing member 64 disposed thereon. As seen in FIG. 10, the first vane 61 has a first length L1 as measured from the pivot axis A to a radially outermost point of the first vane 61 with respect to the pivot axis A. As seen in FIG. 10, the second vane 62 has a second length L2 as measured from the pivot axis A to a radially outermost point of the second vane 62 with respect to the pivot axis A. The second length L2 of the second vane 62 is smaller than the first length L1 of the first vane 61.

Referring back to FIGS. 6 and 7, the chamber 50 is at least partially defined by a first side surface 70, a second side surface 72 and a transverse surface 74. The transverse surface 74 extends between the first and second side surfaces 70 and 72 of the housing 30. The sealing member 64 contacts the transverse surface 74 at two angularly offset points with respect to the pivot axis A. The transverse surface 74 includes a first curved portion 74a that contacts the first contact portion 64a of the sealing member 64, and a second curved portion 74b that contacts the second contact portion 64b of the sealing member 64. The first and second curved portions are non-continuous arcs. The first curved portion 74a has a larger radius of curvature than the second curved portion 74b. The second curved portion 74b is located closer to the pivot axis A than the first curved portion 74a. The transverse surface 74 further includes a non-seal contact portion 74c that is disposed between the first and second curved portion 74a and 74b. The seal contact portion 74c is configured such that the seal contact portion 74c does not contact the first and second contact portions 64a and 64b of the sealing member 64 as the non-linear piston 32 moves between the first position (FIG. 10) and the second position (FIG. 11).

Referring now to FIGS. 12 to 17, a bicycle hydraulic braking system 110 is illustrated that includes a bicycle hydraulic actuating device 112 in accordance with a second embodiment. The bicycle hydraulic actuating device 112 is mounted on a drop handlebar 114. In the second embodiment, the bicycle hydraulic actuating device 112 is a bicycle drop handlebar brake operating device. The bicycle hydraulic actuating device 112 is a left hand side control device operated by the rider's left hand to operate a hydraulically operated brake device 116 for squeezing a brake rotor 120 that is attached to a bicycle wheel 122.

The bicycle hydraulic actuating device 112 basically comprises a housing 130, a non-linear piston 132 and an operating member 134. The housing 130 and the non-linear piston 132 of the bicycle hydraulic actuating device 112 are identical to the housing 30 and the non-linear piston 32 of the first embodiment, the bicycle hydraulic actuating device 12, discussed above. However, the operating member 134 has been modified to be used with a base member 136 that is adapted to be fixed to the drop handlebar 114. The base member 136 includes a bicycle mounting member 136a, which is a band clamp in this second embodiment. The base member 136 includes a gripping portion 136b that is configured to be gripped by a bicycle rider. The gripping portion 136b is a part of the hood bracket of the bicycle hydraulic actuating device 112. The non-linear piston 132 and the operating member 134 are biased to rest positions in the same manner as the first embodiment. Furthermore, the operating member 134 is pivotally mounted on an operating shaft 140 that is fixed to the non-linear piston 132 in the same manner as the first embodiment.

Figure 14:
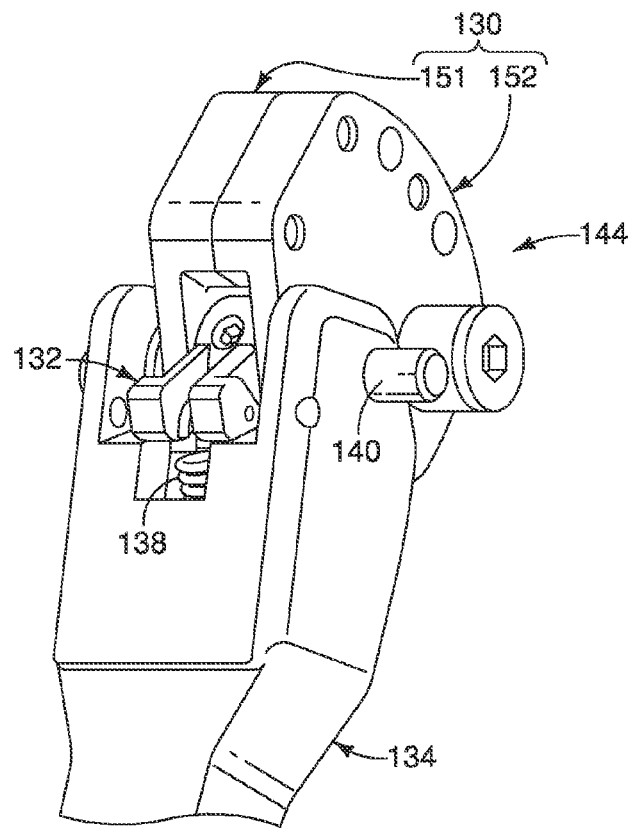
FIG. 14 is a perspective view of an actuator member and a portion of the operating member of the bicycle hydraulic actuating device illustrated FIGS. 12 and 13.
Figure 15:
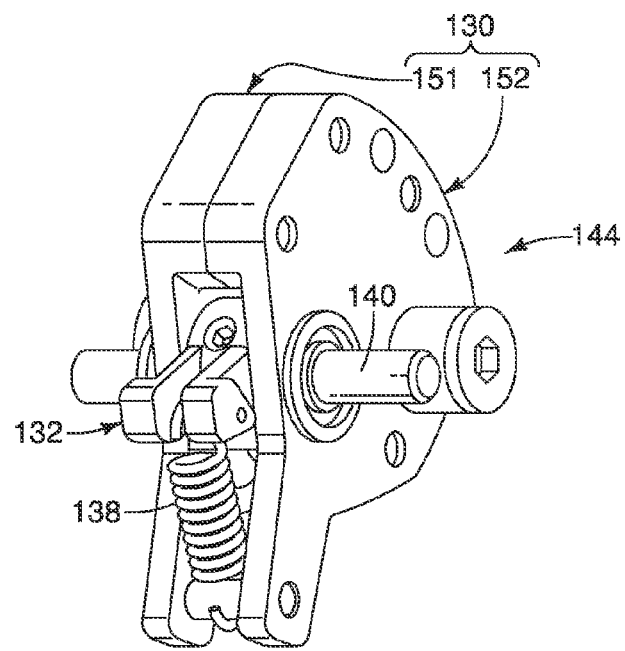
FIG. 15 is a perspective view of the actuator member of the bicycle hydraulic actuating device illustrated FIGS. 12 and 13, with the operating member removed.
Figure 16:
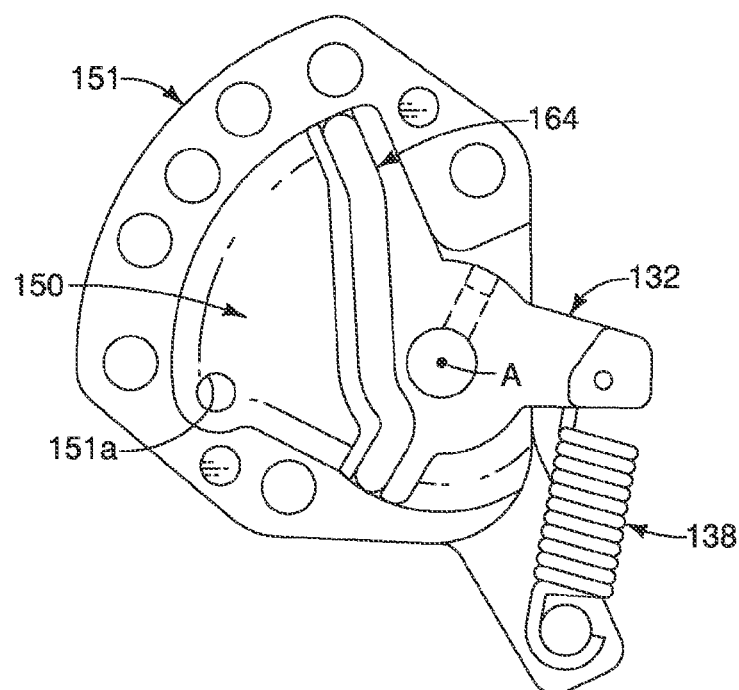
FIG. 16 is an interior view of the actuator member of the bicycle hydraulic actuating device illustrated FIGS. 12 and 13, with the non-linear piston shown in the rest position.
Figure 17:
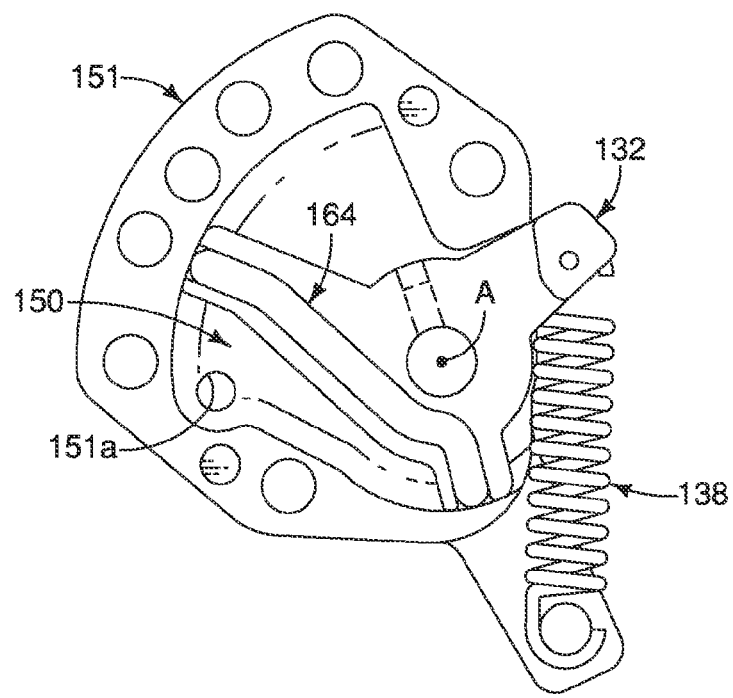
FIG. 17 is an interior view, similar to FIG. 16, of the actuator member of the bicycle hydraulic actuating device illustrated FIGS. 12 and 13, with the non-linear piston shown in the actuated position.

As seen in FIGS. 14 and 15, the housing 130, the non-linear piston 132, the biasing element 138 and the operating shaft 140 constitute a hydraulic actuator member 144. The hydraulic actuator member 144 is identical to the hydraulic actuator member 44 of the first embodiment, and thus, the description of the hydraulic actuator member 44 applies to the hydraulic actuator member 144. Thus, as seen in FIGS. 16 and 17, the housing 130 defines a chamber 150. The housing 130 basically includes a first housing part 151 and a second housing part 152. The first and second housing parts 151 and 152 are fixedly coupled together by a plurality of bolts in the same manner as the first embodiment. The housing 130 is fixedly coupled to the base member 136 by a pair of bolts in the same manner as the first embodiment.

Figure 18:
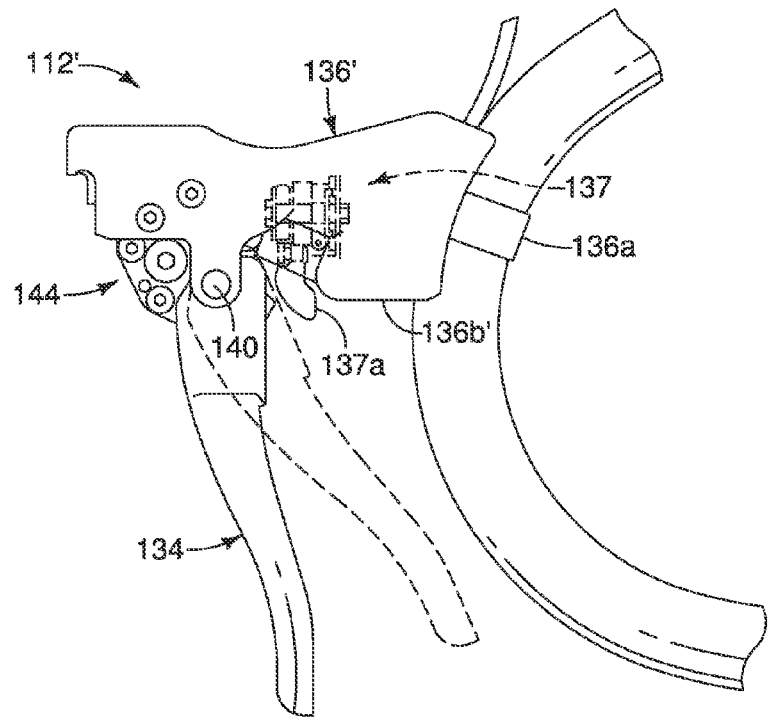
FIG. 18 is an inside elevational view of a bicycle hydraulic actuating device in accordance with a third embodiment.
Figure 19:
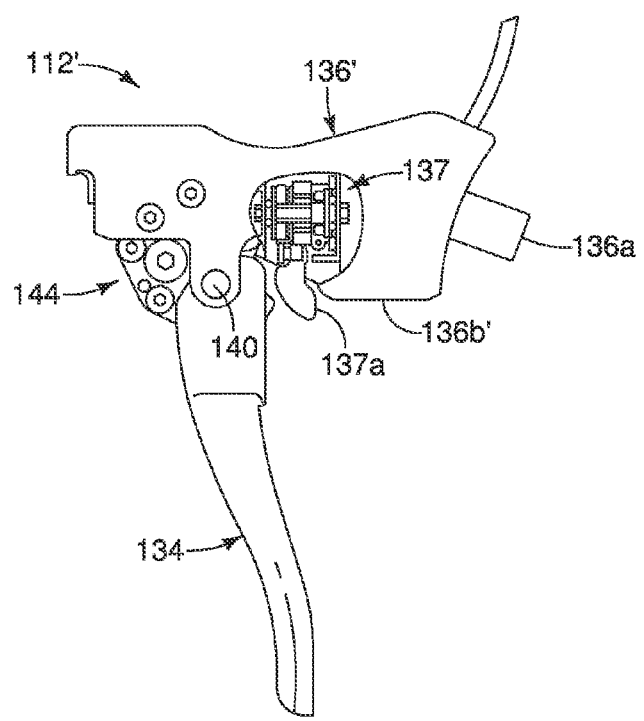
FIG. 19 is an interior side elevational view of the bicycle hydraulic actuating device illustrated in FIG. 18, with a portion of the bracket broken away to illustrated a mechanical shifting unit that is disposed in the bracket.

Referring now to FIGS. 18 and 19, a bicycle hydraulic actuating device 112' in accordance with a third embodiment will now be explained. Basically, the bicycle hydraulic actuating device 112' is identical to the bicycle hydraulic actuating device 112, except that the bicycle hydraulic actuating device 112' includes a shifting function in addition to the braking function. Thus, parts of the bicycle hydraulic actuating device 112' that are identical to those parts of the bicycle hydraulic actuating device 112 will be given the same reference numeral.

Accordingly, in addition to the operating member 134 and the hydraulic actuator member 144, the bicycle hydraulic actuating device 112' includes a modified base member 136' that has the bicycle mounting member 136a and a modified gripping portion 136b'. The bicycle hydraulic actuating device 112' further comprises a mechanical shifting unit 137 that is operatively mounted on the base member 136' and configured to operate a bicycle gear shifting component (not shown). The mechanical shifting unit 137 has a shift lever 137a protruding out of the gripping portion 136b of the base member 136'. The mechanical shifting unit 137 can be any conventional shifting unit that operates a Bowden cable.

Figure 20:
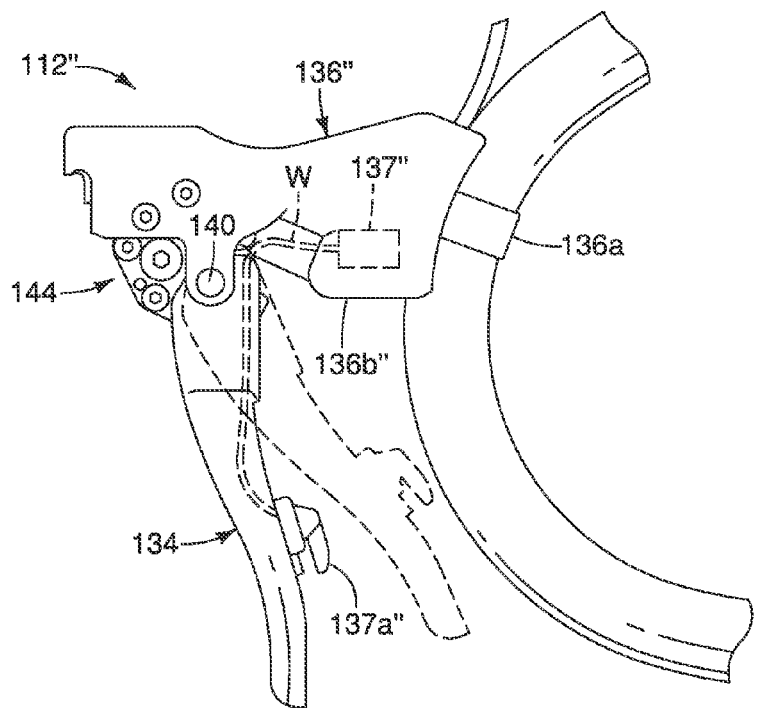
FIG. 20 is an inside elevational view of a bicycle hydraulic actuating device in accordance with a fourth embodiment.
Figure 21:
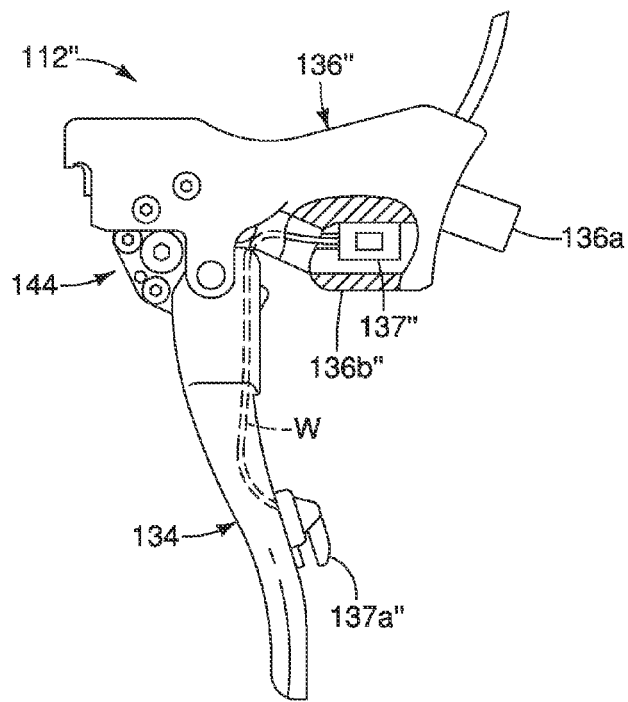
FIG. 21 is an interior side elevational view of the bicycle hydraulic actuating device illustrated in FIG. 20, with a portion of the bracket broken away to illustrated an electric control unit that can be either an electric shift unit or a non-shifting control unit that is disposed in the bracket.

Referring now to FIGS. 20 and 21, a bicycle hydraulic actuating device 112" in accordance with a fourth embodiment will now be explained. Basically, the bicycle hydraulic actuating device 112" is identical to the bicycle hydraulic actuating device 112, except that the bicycle hydraulic actuating device 112" includes a shifting function in addition to the braking function. Thus, parts of the bicycle hydraulic actuating device 112" that are identical to those parts of the bicycle hydraulic actuating device 112 will be given the same reference numeral.

Accordingly, in addition to the operating member 134 and the hydraulic actuator member 144, the bicycle hydraulic actuating device 112" includes a modified base member 136' that has the bicycle mounting member 136a and a modified gripping portion 136b". The bicycle hydraulic actuating device 112" further comprises an electric control unit 137" that is operatively mounted on at least one of the operating member 134 and the base member 136 so as to operate an electrical bicycle component (not shown). Here, the electric control unit 137" includes a switch unit 137a". The switch unit 137a" is mounted on the operating member 134. An electrical wire W connects the switch unit 137a" to a circuit board of the electric control unit 137".

Figure 22:
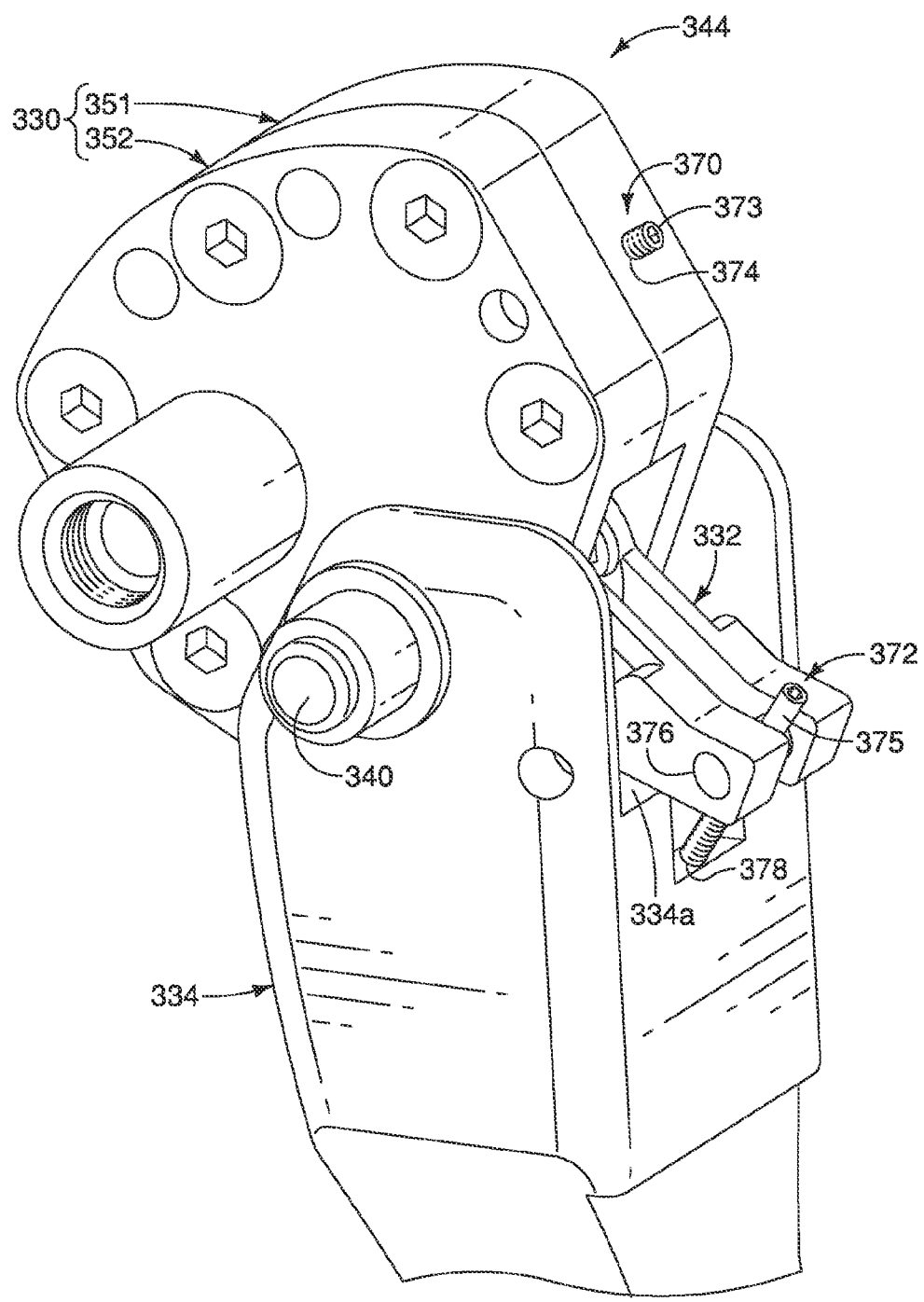
FIG. 22 is a perspective view of a modified actuator member and a portion of a modified operating member having a lever reach adjustment mechanism and a piston position adjustment mechanism.
Figure 23:
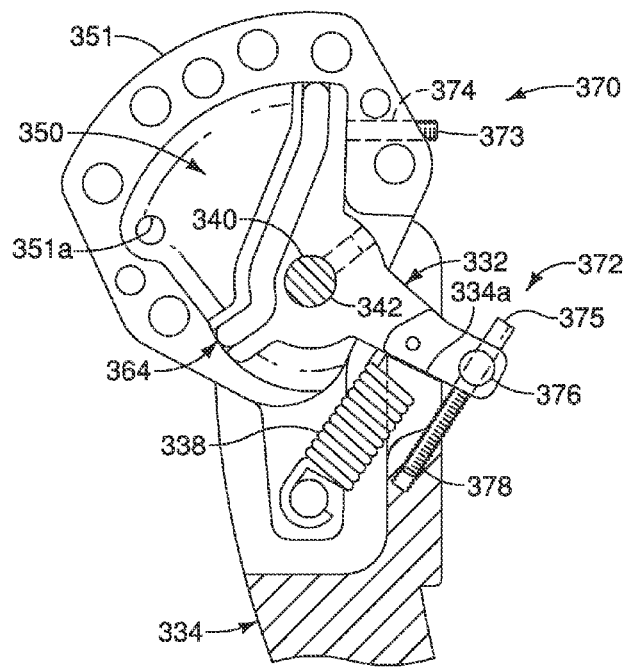
FIG. 23 is an elevational view of the modified actuator member and the portion of the modified operating member illustrated in FIG. 22, but with one of the housing parts removed and a portion of the modified operating member broken away.
Figure 24:
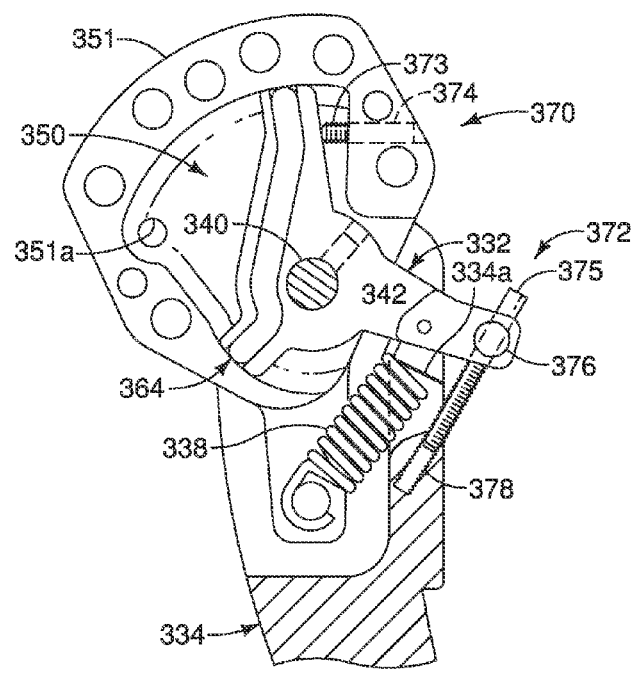
FIG. 24 is an elevational view, similar to FIG. 23, of the modified actuator member and the portion of the modified operating member illustrated in FIG. 22, but with the rest positions of the non-linear piston and the operating member being adjusted to new rest positions.

Referring now to FIGS. 22 to 24, a modified operating member 334 and a modified hydraulic actuator member 344 are illustrated in accordance with a fifth embodiment. Basically, the operating member 334 and the hydraulic actuator member 344 replaces the operating member 134 and the hydraulic actuator member 144 of any one of the bicycle hydraulic actuating device 112, the bicycle hydraulic actuating device 112' and the bicycle hydraulic actuating device 112". The operating member 334 and the hydraulic actuator member 344 are identical to the operating member 134 and the hydraulic actuator member 144, except that the hydraulic actuator member 344 further comprises a piston position adjustment mechanism 370 that is configured to adjust the first position of the non-linear piston 332 along the non-linear movement path, and a lever reach adjustment mechanism 372 that is configured to adjust the rest position of the operating member 334 (i.e., the lever member). Thus, the parts of the operating member 334 and the hydraulic actuator member 344 that are identical to the operating member 134 and the hydraulic actuator member 144 will not be described in detail herein.

FIG. 23 illustrates the operating member 334 and the hydraulic actuator member 344 is non-adjusted rest positions, while FIG. 24 illustrates the operating member 334 and the hydraulic actuator member 344 in adjusted rest positions.

Similar to the prior embodiments, the hydraulic actuator member 344 has a housing 330 having a chamber 350 in which the non-linear piston 332 is disposed. The non-linear piston 332 is biased to the first or rest position by a biasing member 338. The non-linear piston 332 is fixed to an operating shaft 340 that also pivotally supports the operating member 334. The housing 330 basically includes a first housing part 351 with a fluid outlet 351a and a second housing part 352. Also the non-linear piston 332 includes a sealing member 364.

The piston position adjustment mechanism 370 includes an adjustment screw 373 and a threaded bore 374 of the first housing part 351. The adjustment screw 373 is threaded into the threaded bore 374 for adjusting the first position (rest position) of the non-linear piston 332 along the non-linear movement path. In particular, the adjustment screw 373 is extends into the chamber 350 so as to form a stopping abutment that limits the pivotal movement of the non-linear piston 332.

The lever reach adjustment mechanism 372 includes an adjustment screw 375, a trunion 376, and a threaded bore 378 of the operating member 334. The trunion 376 is provided on the non-linear piston 332. The adjustment screw 375 is pivotally supported on the non-linear piston 332 by a trunnion 376 and is threaded into a threaded bore 378. The adjustment screw 375 is rotatably mounted to the trunnion 376, but does not move axially with respect to the trunnion 376 as the adjustment screw 375 is rotated. Thus, rotating the adjustment screw 375 adjusts the rest position of the operating member 334 (i.e., the lever member) with respect to the housing 330 and the base member to which the housing 330 is secured.

Figure 25:
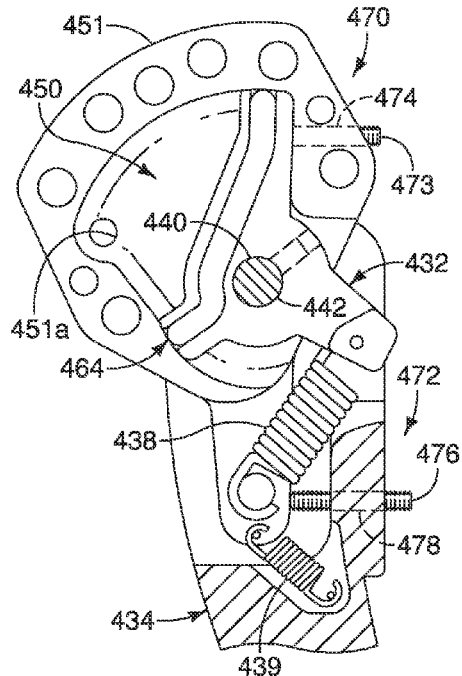
FIG. 25 is an elevational view of a modified actuator member with one of the housing parts removed and a broken away portion of a modified operating member, in which a lever reach adjustment mechanism and a piston position adjustment mechanism have been provided.
Figure 26:
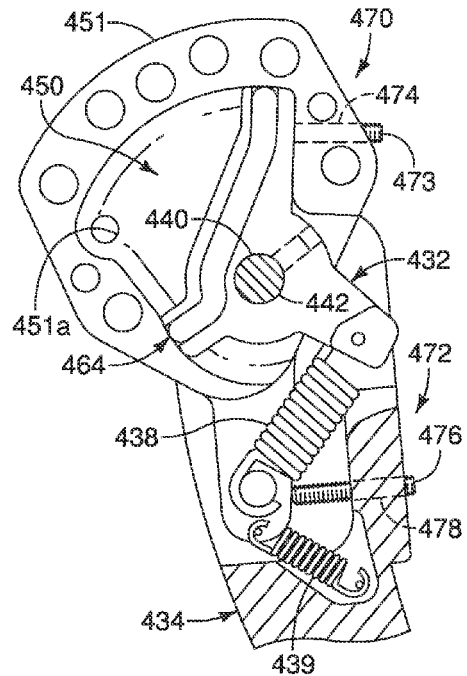
FIG. 26 is an elevational view, similar to FIG. 25, of the modified actuator member and the portion of the modified operating member illustrated in FIG. 25, but with the rest position of the operating member being adjusted to a new rest position.
Figure 27:
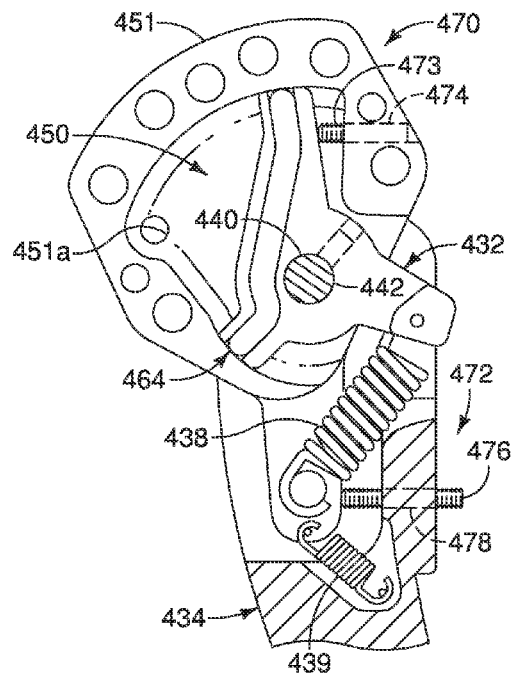
FIG. 27 is an elevational view, similar to FIGS. 25 and 26, of the modified actuator member and the portion of the modified operating member illustrated in FIG. 22, but with the rest position of the non-linear piston being adjusted to a new rest position.

Referring now to FIGS. 25 to 27, a modified operating member 434 and a modified hydraulic actuator member 444 are illustrated in accordance with a sixth embodiment. Basically, the operating member 434 and the hydraulic actuator member 444 replaces the operating member 134 and the hydraulic actuator member 144 of any one of the bicycle hydraulic actuating device 112, the bicycle hydraulic actuating device 112' and the bicycle hydraulic actuating device 112". The operating member 434 and the hydraulic actuator member 444 are identical to the operating member 134 and the hydraulic actuator member 144, except that the hydraulic actuator member 444 further comprises a piston position adjustment mechanism 470 that is configured to adjust the first position of the non-linear piston 432 along the non-linear movement path, and a lever reach adjustment mechanism 472 that is configured to adjust the rest position of the operating member 434 (i.e., the lever member). Thus, the parts of the operating member 434 and the hydraulic actuator member 444 that are identical to the operating member 134 and the hydraulic actuator member 144 will not be described in detail herein.

In this embodiment, the first position of the non-linear piston 432 can be independently adjusted of the adjustment of the rest position of the operating member 434. FIG. 25 illustrates the operating member 434 and the hydraulic actuator member 444 is non-adjusted rest positions. FIG. 26 illustrates the operating member 434 in an adjusted rest position. FIG. 27 illustrates the hydraulic actuator member 444 in an adjusted rest position.

Similar to the prior embodiments, the hydraulic actuator member 444 has a housing 430 having a chamber 450 in which the non-linear piston 432 is disposed. The non-linear piston 432 is biased to the first or rest position by a biasing member 438. The non-linear piston 432 is fixed to an operating shaft 340 that also pivotally supports the operating member 434. The housing 430 basically includes a first housing part 451 with a fluid outlet 451a and a second housing part 452. Also the non-linear piston 432 includes a sealing member 464.

The piston position adjustment mechanism 470 includes an adjustment screw 473 and a threaded bore 474 of the first housing part 451. The adjustment screw 473 is threaded into the threaded bore 474 for adjusting the first position (rest position) of the non-linear piston 432 along the non-linear movement path. In particular, the adjustment screw 473 is extends into the chamber 450 so as to form a stopping abutment that limits the pivotal movement of the non-linear piston 432.

The lever reach adjustment mechanism 472 includes an adjustment screw 476 and a threaded bore 478 of the operating member 434. The adjustment screw 476 is threaded into a threaded bore 478 of the operating member 434. Rotating the adjustment screw 476 adjusts the rest position of the operating member 434 (i.e., the lever member) with respect to the housing 430 and the base member to which the housing 430 is secured. An additional biasing member 439 is provided between the housing 430 and the operating member 434 to bias the operating member 434 towards the rest position, which is established by abutting against the adjustment screw 476.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle hydraulic actuating device. Accordingly, these terms, as utilized to describe the bicycle hydraulic actuating device should be interpreted relative to a bicycle equipped with the bicycle hydraulic actuating device as used in the normal riding position on a horizontal surface. Further, the term "rest position" refers to a position of a part while an external force is not acting on the bicycle hydraulic actuating device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded". "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so long as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic actuating device comprising:
    a housing defining a chamber and having a fluid outlet;
    a non-linear piston movably disposed in the chamber along a non-linear movement path between a first position and a second position; and
    an operating member operatively coupled to the non-linear piston so as to move the non-linear piston within the chamber between the first position and the second position in response to movement of the operating member,
    the non-linear piston including a hub portion defining a pivot axis of the non-linear piston and an operated portion projecting outwardly from the hub portion and extending out of the chamber of the housing to contact the operating member.

2. The bicycle hydraulic actuating device according to claim 1, further comprising
    a base member adapted to fixed to a bicycle part and operatively coupled to the housing.

3. The bicycle hydraulic actuating device according to claim 1, wherein
    the non-linear piston is pivotally mounted within the chamber.

4. The bicycle hydraulic actuating device according to claim 1, wherein
    the operating member is configured to pivot around the pivot axis of non-linear piston.

5. The bicycle hydraulic actuating device according to claim 4, wherein
    the operating member is configured to be a lever member having a first end connected to the non-linear piston and a second end that extends outwardly from the non-linear piston.

6. The bicycle hydraulic actuating device according to claim 1, further comprising
    a biasing element biasing the non-linear piston to the first position.

7. The bicycle hydraulic actuating device according to claim 1, wherein
    the non-linear piston includes a sealing member that is in sealing contact with the housing.

8. The bicycle hydraulic actuating device according to claim 7, wherein
    the chamber is at least partially defined by a first side surface, a second side surface and a transverse surface, the transverse surface extending between the first and second side surfaces of the housing, the sealing member contacts the transverse surface at two angularly offset points with respect to the pivot axis.

9. The bicycle hydraulic actuating device according to claim 8, wherein
    the transverse surface includes a first curved portion contacting a first contact portion of the sealing member and a second curved portion contacting a second contact portion of the sealing member, the first and second curved portions being non-continuous arcs.

10. The bicycle hydraulic actuating device according to claim 9, wherein
    the first curved portion has a larger radius of curvature than the second curved portion.

11. The bicycle hydraulic actuating device according to claim 9, wherein
    the second curved portion is located closer to the pivot axis than the first curved portion.

12. The bicycle hydraulic actuating device according to claim 9, wherein
    the transverse surface further includes a non-seal contact portion disposed between the first and second curved portions and configured without contacting the first and second contact portions of the sealing member as the non-linear piston moves between the first position and the second position.

13. The bicycle hydraulic actuating device according to claim 7, wherein
    the non-linear piston includes a first vane extending outwardly from the hub portion in a radial direction with respect to the pivot axis and a second vane extending outwardly from the hub portion in a radial direction with respect to the pivot axis, the first vane having a free end with the first contact portion of the sealing member disposed thereon, and the second vane having a free end with the second contact portion of the sealing member disposed thereon.

14. The bicycle hydraulic actuating device according to claim 13, wherein
the first vane has a first length as measured from the pivot axis to a radially outermost point of the first vane with respect to the pivot axis; and
the second vane has a second length as measured from the pivot axis to a radially outermost point of the second vane with respect to the pivot axis, the second length of the second vane being smaller than the first length of the first vane.

15. The bicycle hydraulic actuating device according to claim 2, further comprising
a mechanical shifting unit operatively mounted on the base member and configured to operate a bicycle gear shifting component.

16. The bicycle hydraulic actuating device according to claim 15, wherein
the mechanical shifting unit has a shift lever protruding out of the base member.

17. The bicycle hydraulic actuating device according to claim 2, further comprising
an electric control unit operatively mounted on at least one of the operating member and the base member so as to operate an electrical bicycle component.

18. The bicycle hydraulic actuating device according to claim 17, wherein
the electric control unit includes a switch unit.

19. The bicycle hydraulic actuating device according to claim 18, wherein
the switch unit is mounted on the operating member.

20. The bicycle hydraulic actuating device according to claim 2, wherein
the base member includes a gripping portion configured to be gripped by a bicycle rider.

21. The bicycle hydraulic actuating device according to claim 1, wherein
the operating member is configured to be a lever member moving between a rest position and an operated position.

22. The bicycle hydraulic actuating device according to claim 21, further comprising
a lever reach adjustment mechanism configured to adjust the rest position of the lever member.

23. The bicycle hydraulic actuating device according to claim 1, further comprising
a piston position adjustment mechanism configured to adjust the first position of the non-linear piston along a non-linear movement path.

* * * * *